Oct. 23, 1962     H. G. SCAMMON     3,059,257
COUNTER LOADER
Filed April 14, 1961     2 Sheets-Sheet 1
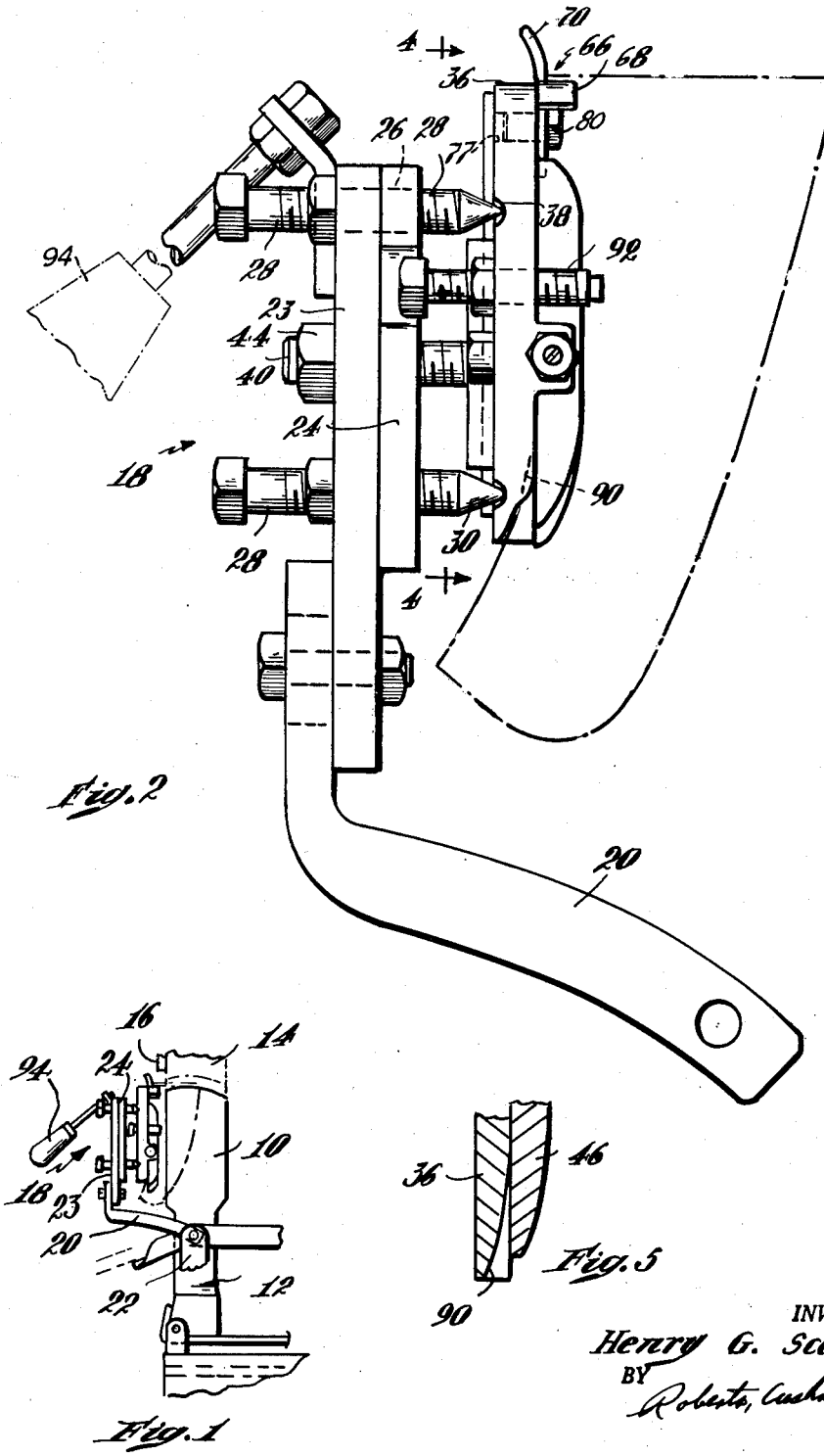
INVENTOR.
Henry G. Scammon
BY
Roberts, Cushman + Grover
ATT'YS INVENTOR.
Henry G. Scammon
BY
Roberts, Cushman & Grover
ATT'YS

United States Patent Office 3,059,257
Patented Oct. 23, 1962

3,059,257
COUNTER LOADER
Henry G. Scammon, % Gould & Scammon, Inc.,
207 Court St., Auburn, Maine
Filed Apr. 14, 1961, Ser. No. 102,981
13 Claims. (Cl. 12—66)

This invention relates to molding apparatus for shaping counter blanks and more especially to a loading device therefor, of the kind disclosed in my Patent No. 2,980,932, dated April 25, 1961.

The principal objects of the invention are to provide a loading device embodying the advantages of the foregoing application and, in addition, certain other advantages, to wit, to provide for molding of counters for left and right shoes, as distinguished from the straight molding performed on the foregoing apparatus, but without limiting it to right or left shoes; to provide for molding counters which have an accentuated curve at the extremities of their wings; and to provide for better gripping action of the wings of the counter and release thereof when the counter is presented to the mold members.

As illustrated herein, the loader is supported for movement to and from the mold members and comprises a support mounting spaced pairs of fingers, between which the wings of the counter may be inserted, with the central portion arched across the space between the fingers, and a gauge on the support situated medially of the fingers for engagement with the arched portion of the counter, the gauge being rotatable toward one side or the other to adjust the length of the wing at that side. There is means on the gauge engageable with the back part of the arched portion of the counter to hold the counter in a position such that the length of the wing at the side toward which the gauge is adjustable is the longer. This means may take the form of a pin fixed to the convex surface of the gauge, engageable with the notch at the back of the counter. The gauge is preferably adjustable heightwise and there is means yieldably supporting the gauge for movement heightwise, so that after the loader has been moved into operative position, movement of the mold members into engagement will permit downward displacement of the gauge. Heightwise movement of the means supporting the gauge is limited by an abutment and spring means normally hold the gauge in contact with the abutment. Preferably the outer fingers of each pair of fingers are movable perpendicularly relative to the inner fingers and angularly about axes perpendicular to the support, and there are yieldable means operating on the outer fingers urging them toward the inner fingers and yieldably resisting their angular movement. The inner fingers are, in turn, movable toward the outer fingers, angularly about axes perpendicular to the support, and there is yieldable means urging the inner fingers toward the outer fingers.

The invention will now be described in greater detail with reference to the accompanying drawings wherein:

FIG. 1 is a side elevation of the mount shown in relation to the mold parts;

FIG. 2 is a side elevation of the loader to much larger scale;

FIG. 5 is a section taken on the line 5—5 of FIG. 3.

Figure 4:
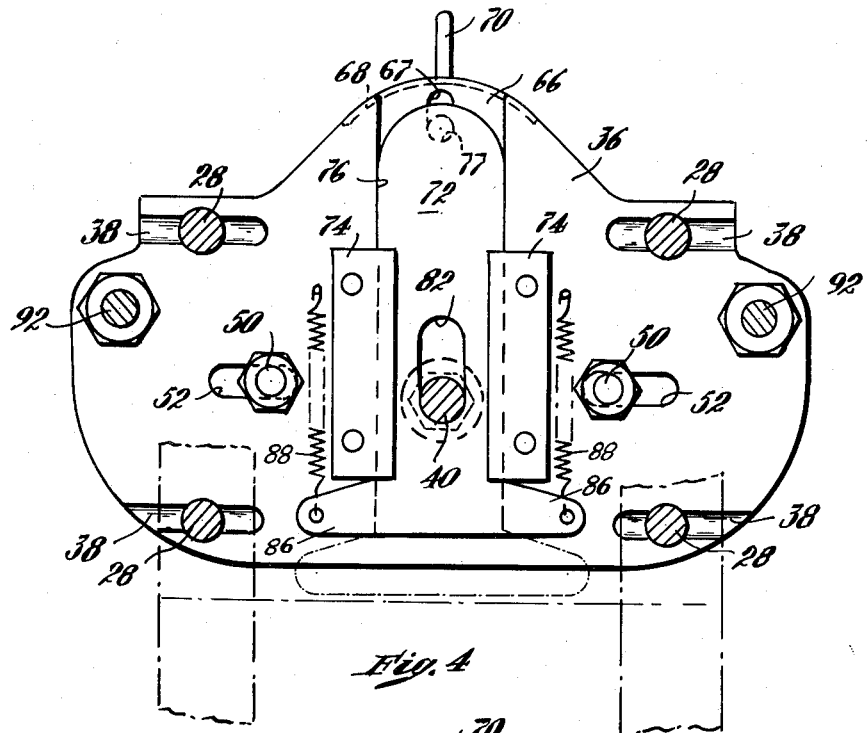
FIG. 4 is an elevation taken on the line 4—4 of FIG. 2.

Referring to the drawings, FIG. 1, there is shown a male mold part 10 which stands in an upright position on a post 12 beneath a female mold part 14, the male mold part being movable upwardly and the female mold part being movable downwardly to close about a counter which has been previously placed astride the upper end of the mold part 10, and thus to conform the counter to the upper curved surface of the male part and its downwardly extending surfaces at opposite sides, so that the counter takes the shape of a back part of a shoe. In conjunction with the mold parts, there is a wiper 16 which moves downwardly along the forward face of the female mold part, across the male mold part after the counter has been engaged between the two, so as to form a flange at the foot of the counter. The foregoing parts are all conventional as shown, for example, in the patent to Bailey, No. 2,185,937, and need not be further described herein for a complete understanding of the loader which forms the subject matter of this invention.

The loader 18 is supported by a pair of spaced arms 20—20 for pivotal movement to and from the male mold part on a support 22 which is movable upwardly toward the female mold part with the male mold part. The arms 20—20 have fixed to their upper ends extensions 23—23 and these, in turn, support a plate 24. The plate 24 contains, at its upper and lower edges, near its ends, threaded openings 26 in which are mounted screw bolts 28 having heads at their rear ends and cone-shaped tips 30 at their forward ends. The plate 24 also contains a centrally located hole. A supporting plate 36, having recesses 38 in its rear side, for engagement with the conical tips 30 of the screw bolts, is mounted on and held engaged with the conical tips of the bolts by a bolt 40, the head 42 of which is seated in an opening in the supporting plate 36 and the shank of which extends rearwardly therefrom through the hole in the plate 24 and has on it a nut 44. As thus constructed, it is evident that the plate 36 may be adjusted so as to have any desired angular position.

Two pairs of fingers are mounted on the front face of the supporting plate 36, each pair comprising an outer finger 46 and an inner finger 48, the adjacent edges of which are adapted to receive between them the wings of a counter, so as to hold the latter spaced apart in parallel relation, with the back of the counter arched across the space between the pairs of fingers in a shape which corresponds substantially to the shape of the male mold part, so that when the loader is moved up to the male mold part, it will fit over its surface. Each outer finger 46 is mounted on a screw bolt 50 which extends through the finger and through a slot 52 in the supporting plate 36, the latter being situated widthwise of the plate. Thus, each finger 46 is movable transversely and is rotatable about an axis perpendicular to the supporting plate. A lug 56 containing a screw-threaded opening 58 is situated on the supporting plate opposite each outer finger and a screw 60 is mounted in the lug with its inner end projecting inwardly therefrom toward the outer edge of the finger. A rubber block 54 is disposed between the outer edge of the finger and the inner end of the screw and is held against the finger by the screw. A metal bearing plate 62 is disposed between the block and the screw. The rubber block operates on the outer finger to urge it toward the inner finger and also yieldably to resist rotation. The inner fingers have inwardly projecting lugs 61 which overlap, contain slots 63, and are pivotally mounted on a stud 65 projecting from the supporting plate 36. A nut 67 holds the inner fingers in place. The inner fingers are yieldingly urged against the outer fingers by a spring means 64 disposed between them.

A gauge 66 is mounted on the front side of the supporting plate 36 midway between the pairs of fingers and above their upper ends, so as to have contact with the inner surface of the arched portion of the counter. The gauge has a curved, forwardly projecting flange 68 and midway between its ends an upright pin 70 fixed to its convex surface. The pin is adapted to engage the notch at the back of the counter. The gauge is mounted, as will subsequently appear, for rotational adjustment, in one direction or the other, about an axis perpendicular to the face of the support and, by such adjustment, to hold the counter in a position such that the length of the wing between the pair of fingers toward which the gauge is adjusted is the longer, thus to provide for left and right shoes. The gauge is also movable heightwise, both for the purpose of adjustment for counters of different length and also for the purpose of yielding when the mold parts are brought into engagement. To this end, a slide 72 (FIG. 4) is disposed at the rear side of the supporting plate 36 between a pair of gibs 74—74 so as to be slidable up and down thereon. The supporting plate 36 contains a vertically disposed slot 76 and the slide 72 has a block 75 screwed to its front side which projects into the slot. The block 75 contains a threaded opening 77 and the gauge 66 is mounted on the block by a screw bolt 80 screwed into the threaded opening 77 to fix the gauge at the desired position. A vertical slot 67 in the gauge 66 through which the screw bolt 80 passes provides for vertical adjustment of the gauge. The slide 72 contains a vertically disposed slot 82 through which the screw bolt 40 passes. The lower end of the slide has laterally extending wings 86—86 and a pair of coiled springs 88—88 are attached thereto and to the back of the supporting plate 36, so as normally to urge the slide 72 upwardly and to hold it with the bottom of the slot 82 engaged with the screw bolt 40. It is thus possible for the slide 72 to be displaced downwardly to the dotted line position shown in FIG. 3. Such downward movement is effected after the loader has moved up to a position in which the counter is engaged between the mold parts by relative movement of the mold parts into engagement.

Figure 3:
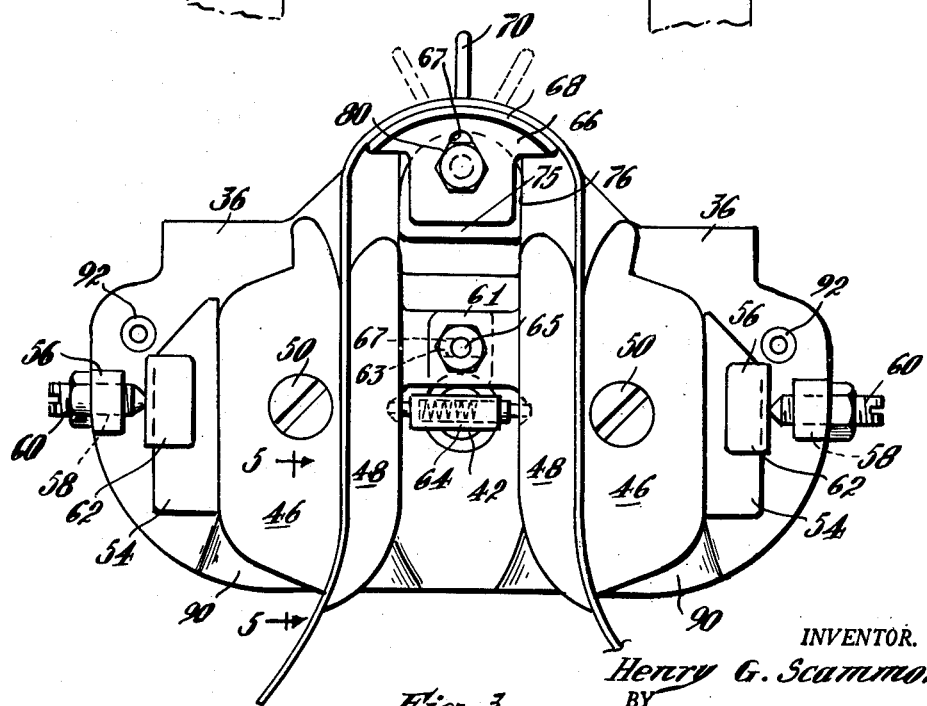
FIG. 3 is an elevation as seen from the right-hand side of FIG. 1.

In order to adapt the loader for counters which have exaggerated curves at their extremities, the lower part of the supporting plate 36 (FIG. 5) is provided with rearwardly convex surfaces 90—90 as shown in FIGS. 2 and 3. Screws 92 are provided to adjust the position of the loader relative to the mold parts.

A handle 94 is fastened to the rear side of one of the extensions 23 to effect movement of the loader into and out of operative position.

Preparatory to use, the gauge 66 is adjusted in one direction or the other according to the hand of the shoe and by an amount corresponding to the desired increase in length of the wing at that side toward which the gauge is adjusted. The notch at the back of the counter is engaged with the pin 70 to hold it in place. The holder is now moved up into operative position to dispose the counter astride the male mold part. The mold parts are now brought together to shape the upper and as they move into engagement the gauge yields.

It is obvious with this construction and the specific gauge shown herein that counters can be molded for left or right shoes, whereas in the previous apparatus only straight counters could be molded. Furthermore, in contrast to the previous apparatus the fingers have relative movement both toward each other and angularly and the pressures may be adjusted thus providing for gripping the wings at pressures which are consistent with the character of the material. Moreover, because of the curved lower surface of the supporting plate, counters having a rather extreme curve at their extremities can be shaped in addition to straight counters.

It should be understood that the present disclosure is for the purpose of illustration only and that this invention includes all modifications and equivalents which fall within the scope of the appended claims.

I claim:
1. In a counter molding machine having spaced, relatively movable male and female mold parts engageable to shape a counter blank placed therebetween, a loader upon which the counter blank may be mounted and held in a shape to be placed astride the male mold, said loader being movable to and from the mold parts and comprising a support mounting spaced pairs of fingers between which the wings of the counter blank may be inserted with the central portion arched across the space between the fingers, and a gauge on the support, situated medially of the fingers, for engagement with the arched portion of the counter, said gauge being rotatable toward one side or the other to adjust the length of the wing at that side.

2. In a counter molding machine having spaced, relatively movable male and female mold parts engageable to shape a counter blank placed therebteween, a loader upon which the counter blank may be placed and held in a shape to be placed astride the male mold, said loader being movable from a retracted position to a position adjacent the male mold and comprising a support mounting spaced pairs of fingers between which the wings of the counter blank may be inserted with the central portion arched across the space between the fingers, and a gauge on the support situated medially of the fingers for engagement with the inside of the arched portion of the counter, said gauge being rotatably adjustable about an axis perpendicular to the face of the support, and means on the gauge cooperable with the back of the counter to hold the counter in a position such that the length of the wing at the side toward which the gauge is adjusted is the longer.

3. In a counter molding machine having spaced, relatively movable male and female mold parts engageable to shape a counter blank placed therebetween, a loader upon which the counter blank may be placed and held in a shape to be placed astride the male mold part, said loader being movable from a retracted position to a position adjacent the male mold and comprising a support mounting spaced pairs of fingers between which the wings of the counter blank may be inserted with the central portion arched across the space between the fingers, a gauge situated on the support medially of the fingers, said gauge having a forwardly projecting curved surface for contact with the inner side of the arched portion of the counter, said gauge being adjustably rotatable in one direction or the other about an axis perpendicular to the plane of the support, and a pin fixed to the convex surface of the gauge midway between its ends for engagement with the notch at the back of the counter, said pin being cooperable with the notch at the back of the counter to hold it in a position such that the length of the wing at the side toward which the gauge is adjusted is the longer.

4. Apparatus according to claim 3, wherein the gauge is adjustable heightwise.

5. Apparatus according to claim 3, wherein there is means supporting the gauge on the support for heightwise movement, an abutment for limiting the heightwise movement, and means operating to hold the gauge in engagement with the abutment.

6. In a counter molding machine having spaced, relatively movable male and female mold parts engageable to shape a counter blank placed therebetween, a loader upon which the counter blank may be placed and held in a shape to be placed astride the male mold part, said loader being movable from a retracted position to a position adjacent the male mold and comprising a plate mounting spaced pairs of fingers between which the wings of the counter blank may be inserted with the central portion arched across the space between the fingers, a slide disposed against the back side of the support, means slidably supporting the slide midway between the pair of fingers, said support containing a slot situated above the upper end of the pairs of fingers midway thereof, a block at the upper end of the slide, said block extending forwardly through the slot, a gauge, a bolt supporting the gauge at the front side of the block, said gauge being adjustable about the axis of the bolt, an abutment on the support limiting upward movement of the slide, and springs yieldingly holding the slide against the abutment.

7. In a counter molding machine having spaced, relatively movable male and female mold parts engageable to shape a counter blank placed therebetween, a loader upon which the counter blank may be placed and held in a shape to be placed astride the male mold part, said loader being movable from a retracted position to a position adjacent the male mold and comprising a support mounting spaced pairs of fingers between which the wings of the counter blank may be inserted with the central portion arched across the space between the fingers, a slide disposed against the back side of the support, gibs slidably supporting the slide midway between the fingers, said support and slide each containing a slot, a gauge, means of the slide projecting through the slot mounting the gauge for adjustment about an axis perpendicular to the face of the support, means on the support projecting rearwardly therefrom into the slot in the slide which limits heightwise movement of the slide, and spring means operating on the lower end of the slide yieldingly to hold it elevatel with the bottom of the slot therein engaged with the means on the support.

8. Apparatus according to claim 7, wherein the gauge is adjustable heightwise relative to the slide.

9. Apparatus according to claim 1, wherein the outer fingers of each pair of fingers are supported for movement perpendicularly relative to the inner fingers, and there are yieldable means operating on the fingers in directions yieldingly to press the outer fingers toward the inner fingers.

10. Apparatus according to claim 1, wherein the support contains slots at right angles to the fingers, bolts slidable in the slots support the outer fingers against the front face of the support for movement perpendicular to the inner fingers and angular movement about the axes of the bolts, adjustable screws are mounted on the support opposite the outer sides of the outer fingers, and rubber blocks are disposed between the inner ends of the screws and the outer fingers.

11. Apparatus according to claim 1, wherein the inner fingers are supported on the support for angular movement about axes perpendicular to the face of the support, and there is yieldable means urging the inner fingers into engagement with the outer fingers.

12. Apparatus according to claim 1, wherein the pairs of fingers are supported for angular movement about axes perpendicular to the face of the support, the outer fingers are movable linearly toward the inner fingers, and there are yieldable means urging the outer fingers toward the inner fingers and the inner fingers toward the outer fingers.

13. Apparatus according to claim 1, wherein the surface of the support, adjacent the lower ends of each pair of fingers is rearwardly convex.

No references cited.